United States Patent [19]

Clough et al.

[11] Patent Number: 5,182,165
[45] Date of Patent: Jan. 26, 1993

[54] COATING COMPOSITIONS

[75] Inventors: Thomas J. Clough, Santa Monica; Victor L. Grosvenor, Topanga; Naum Pinsky, Thousand Oaks, all of Calif.

[73] Assignee: Ensci, Inc., Santa Monica, Calif.

[21] Appl. No.: 348,786

[22] Filed: May 8, 1989

Related U.S. Application Data

[60] Continuation-in-part of Ser. No. 272,517, Nov. 17, 1988, abandoned, and a continuation-in-part of Ser. No. 272,539, Nov. 17, 1988, abandoned, which is a continuation-in-part of Ser. No. 82,277, Aug. 6, 1987, Pat. No. 4,787,125, which is a division of Ser. No. 843,047, Mar. 24, 1986, Pat. No. 4,713,306.

[51] Int. Cl.$^5$ .............................................. B32B 7/00
[52] U.S. Cl. .................. 428/263; 428/268; 428/408; 428/902
[58] Field of Search ............ 428/251, 263, 268, 273, 428/408, 902; 427/165, 250, 255

[56] References Cited

U.S. PATENT DOCUMENTS

| | | | |
|---|---|---|---|
| 3,544,361 | 6/1966 | Servais | 117/124 |
| 3,562,127 | 2/1971 | Wooton et al. | 204/164 |
| 3,577,273 | 5/1971 | Soderberg | 117/211 |
| 3,713,884 | 1/1973 | Maley | 117/211 |
| 3,870,567 | 3/1975 | Palmer et al. | 136/148 |
| 3,890,429 | 6/1975 | Pytlewski | 423/395 |
| 3,959,565 | 5/1976 | Jordan et al. | 428/432 |
| 4,229,491 | 10/1980 | Dislich et al. | 427/160 |
| 4,258,080 | 3/1981 | Sonoda et al. | 427/82 |
| 4,275,130 | 6/1981 | Rippel et al. | 429/144 |
| 4,297,420 | 9/1981 | Chenaux et al. | 429/217 |
| 4,349,369 | 9/1982 | Van Laethem et al. | 65/604 |
| 4,371,740 | 2/1983 | Clem | 136/256 |
| 4,405,697 | 9/1983 | Rowlette | 429/161 |
| 4,510,219 | 4/1985 | Rowlette | 429/212 |
| 4,535,315 | 8/1985 | Sakai | 338/34 |
| 4,539,268 | 9/1985 | Rowlette | 429/54 |
| 4,542,082 | 9/1985 | Rowlette | 429/210 |
| 4,547,443 | 10/1985 | Rowlette et al. | 429/217 |

OTHER PUBLICATIONS

"Electroless Deposition of $SnO_2$ and Antimony Doped $SnO_2$ Films", D. Raviendra et al, J. Phys. Chem. Solids, vol. 46, No. 8, pp. 945-950, 1985 USA.
"Sn(Sb)-Oxide Sol-Gel Coatings on Glass", C. J. R. Gonzalez-Oliver et al, J. Non-Crystalline Solids 82, pp. 400-410, 1986, Amsterdam.
"Physical Properties of Tin Oxide Films Deposited by Oxidation of $SnCl_2$", N. S. Murty et al, Thin Solid Films 92, pp. 347-354, 1982 The Netherlands.
"Tin Dioxide Gas Sensors", Part 1, J. F. McAleer et al, J Chem Soc, Faraday Trans I, 83, pp. 1323-1346, 1987.
"Tin Dioxide Gas Sensors", Part 2, J. F. McAleer et al, J Chem Soc, Faraday Trans I, 84, pp. 441-457, 1988.
"Preparation of Thick Crystalline Films of Tin Oxide and Porous Glass Partially Filled with Tin Oxide", J Electrochem Soc, 116, pp. 1205-1208, 1969.
"The Catalyzed Conversion of Methane to Methanol at High Pressure", N. R. Hunter et al, Symp Hydrocarbon Oxidation, Amer Chem Soc, 1987.
"Compression Molding of Conductive Plastics", D. E. Davenport.
"A Review of Tin Oxide-Based Catalytic Systems: Preparation Characterization and Catalytic Behavior", G. B. Hoflund, NASA Conference Publication 2456, pp. 179-192, 1987.
"Sol-Gel AR Films for Solar Applications", C. S. Ashley et al, work performed at Sandia National Laboratories.
"Sol-Gel Glass Research", Technology Forecasts and Technology Surveys, pp. 5-7, 1983.
"Tin Oxide Films on Glass Substrates by a Sol-Gel Technique", R. Puyane et al, pp. 190-197.
"High Selectivity of CVD $SnO_2/SiO_2$ Catalyst for Oxidative Dehydrogenation of Ethylbenzene", T. Hattori, et al, Prep of Catalysts IV, pp. 113-123, 1987.
Chemical Abstracts: 108:226223k; 108:222244v; 108:206808b; 108:187304r; 108:186329r; 108:170586m; 108:134682f; 108:130823c; 108:118199y; 108:101743y; 108:94390a; 108:81016h.
Partial abstract Sharp Corp.; 108:61718k; 108:55553m; 108:15544c; 108:7849r; 108:6747u; 107:243657b; 107:243656a; 107:243559w; 107:24356i; 107:219831h; 107:219602j.

*Primary Examiner*—James J. Bell
*Attorney, Agent, or Firm*—Frank J. Uxa, Jr.

[57] ABSTRACT

A composition comprising a three dimensional substantially carbon or inorganic structural element suitable for high temperature use and a tin oxide-containing coating thereon.

37 Claims, 1 Drawing Sheet

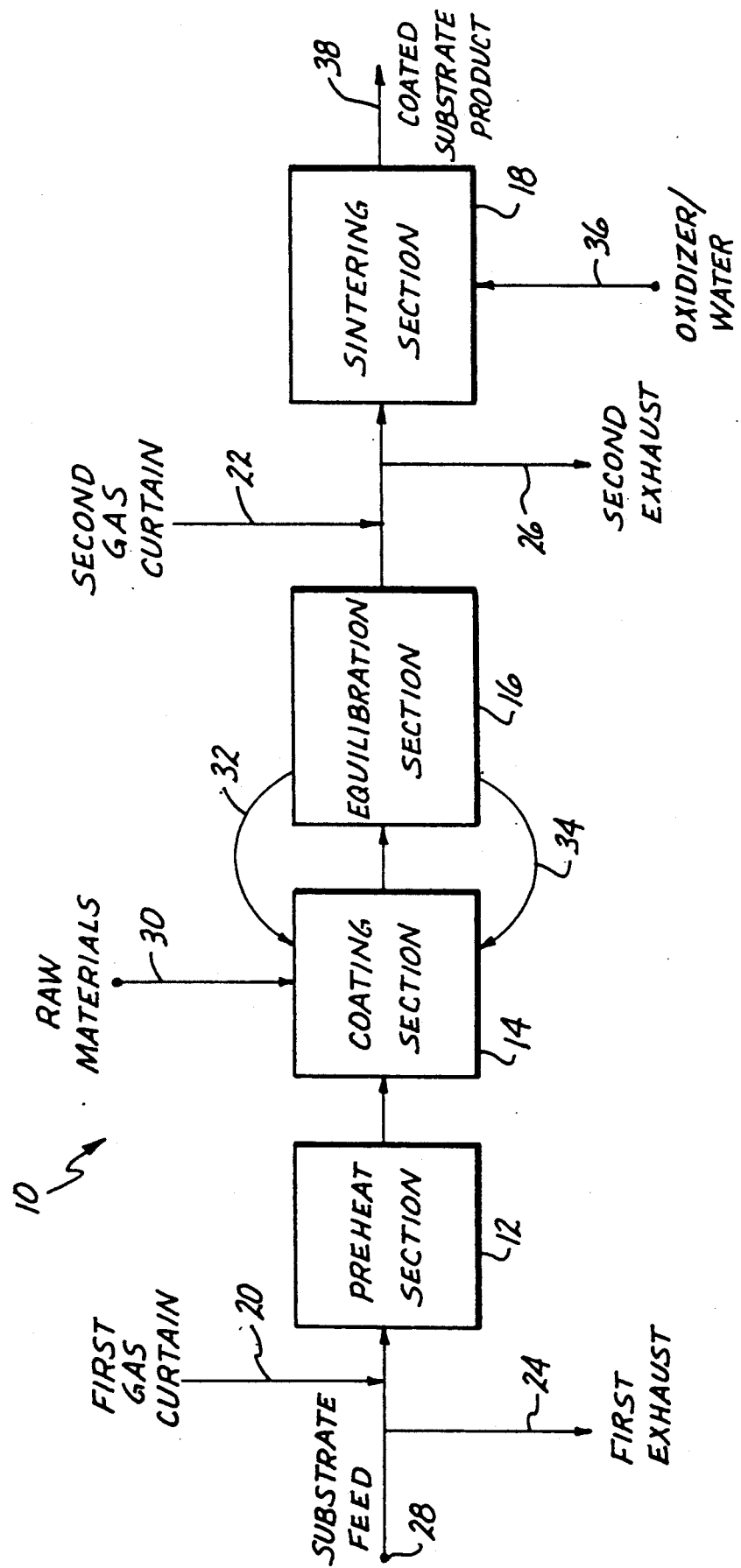

COATING COMPOSITIONS

RELATED APPLICATIONS

This application is a continuation-in-part of co-pending applications Ser. Nos. 272,517 and 272,539, each filed Nov. 17, 1988, is now abandoned each of which applications is a continuation-in-part of application Ser. No. 082,277, filed Aug. 6, 1987, now U.S. Pat. No. 4,787,125 which application, in turn, is a division of application Ser. No. 843,047, filed Mar. 24, 1986, now U.S. Pat. No. 4,713,306. These earlier filed applications and these U.S. Patents are incorporated in their entireties herein by reference.

BACKGROUND OF THE INVENTION

The present invention relates to a process for coating a substrate. More particularly, the invention relates to coating a substrate with a tin oxide-containing material, preferably an electronically conductive tin oxide-containing material.

Even though there has been considerable study of alternative electrochemical systems, the lead-acid battery is still the battery of choice for general purposes, such as starting an automotive vehicle, boat or airplane engine, emergency lighting, electric vehicle motive power, energy buffer storage for solar-electric energy, and field hardware, both industrial and military. These batteries may be periodically charged from a generator.

The conventional lead-acid battery is a multi-cell structure. Each cell comprises a set of vertical positive and negative plates formed of lead-acid alloy grids containing layers of electrochemically active pastes. The paste on the positive plate when charged comprises lead dioxide, which is the positive active material, and the negative plate contains a negative active material such as sponge lead. An acid electrolyte, based on sulfuric acid, is interposed between the positive and negative plates.

Lead-acid batteries are inherently heavy due to use of the heavy metal lead in constructing the plates. Modern attempts to produce light-weight lead-acid batteries, especially in the aircraft, electric car and automotive vehicle fields, have placed their emphasis on producing thinner plates from lighter weight materials used in place of and in combination with lead. The thinner plates allow the use of more plates for a given volume, thus increasing the power density.

Higher voltages are provided in a bipolar battery including bipolar plates capable of through-plate conduction to serially connected electrodes or cells. The bipolar plates must be impervious to electrolyte and be electrically conductive to provide a serial connection between electrodes.

U.S. Pat. Nos. 4,275,130; 4,353,969; 4,405,697; 4,539,268; 4,507,372; 4,542,082; 4,510,219; and 4,547,443 relate to various aspects of lead-acid batteries. Certain of these patents discuss various aspects of bipolar plates.

Attempts have been made to improve the conductivity and strength of bipolar plates. Such attempts include the use of conductive carbon particles or filaments such as carbon, graphite or metal in a resin binder. However, such carbon-containing materials are oxidized in the aggressive electrochemical environment of the positive plates in the lead-acid cell to acetic acid, which in turn reacts with the lead ion to form lead acetate, which is soluble in sulfuric acid. Thus, the active material is gradually depleted from the paste and ties up the lead as a salt which does not contribute to the production or storage of electricity.

The metals fare no better; most metals are not capable of withstanding the high potential and strong acid environment present at the positive plates of a lead-acid battery. While some metals, such as platinum, are electrochemically stable, their prohibitive cost prevents their use in high volume commercial applications of the lead-acid battery.

One approach that shows promise of providing benefits in lead acid batteries is a battery element, useful as at least a portion of the positive plates of the battery, which comprises an acid resistant substrate coated with a stable doped tin oxide.

The combination of an acid resistant substrate coated with doped tin oxide has substantial electrical, chemical, physical and mechanical properties making it useful as a lead-acid battery element. For example, the element has substantial stability in the presence of, and is impervious to, the sulfuric acid or the sulfuric acid-based electrolyte. The doped tin oxide coating on the acid resistant substrate provides for increased electrochemical stability and reduced corrosion in the aggressive, oxidative-acidic conditions present on the positive side of lead-acid batteries.

Another application where substrates with coatings, e.g., electronically conductive coatings, find particular usefulness is in the promotion of chemical reactions, e.g., gas/liquid phase reactions, electro catalytic reactions, photo catalytic reactions, redox reactions, etc. As an example of a type of reaction system, a catalytic, e.g., metallic, component is contacted with the material to be reacted, e.g., nitrogen oxides to be reduced, and a reducing gas is passed through or near to the catalytic component to enhance the chemical reaction, e.g., the nitrogen oxide reduction to nitrogen. In addition, using a substrate for the catalytic component which is coated with an electronically conductive material is highly advantageous for electro catalysis since an electronic field/current can be effectively and efficiently provided to or near the catalytic component for electron transfer reactions. Many types of chemical reactions can be advantageously promoted using coated substrates. Tin-oxide containing coatings on substrates may promote electron transfer whether or not the chemical reaction is conducted in the presence of an electrical current or field. In addition, tin oxide coated substrates and sintered tin dioxides are useful as gas sensors, as gas purifiers, as flocculants and as filter medium components. One or more other components, e.g., metal components, are often included in certain of these applications.

In many of the above-noted applications it would be advantageous to have an electronically conductive tin oxide which is substantially uniform, has high electronic conductivity, and has good chemical properties, e.g., morphology, stability, etc.

A number of techniques may be employed to provide conductive tin oxide coatings on acid resistant substrates. For example, the chemical vapor deposition (CVD) process may be employed. This process comprises contacting a substrate with a vaporous composition comprising a tin component and a dopant-containing material and contacting the contacted substrate with an oxygen-containing vaporous medium at conditions effective to form the doped tin oxide coating on the substrate. Conventionally, the CVD process occurs simultaneously at high temperatures at very short contact times so that tin oxide is initially deposited on the substrate. However tin oxide can form off the substrate resulting in a low reagent capture rate. The CVD process is well known in the art for coating a single flat surface which is maintained in a fixed position during the above-noted contacting steps. The conventional CVD process is an example of a "line-of-sight" process or a "two dimensional" process in which the tin oxide is formed only on that portion of the substrate directly in the path of the tin source as tin oxide is formed on the substrate. Portions of the substrate which are shielded from the tin oxide being formed, e.g., such as pores which extend inwardly from the external surface and substrate layers which are at least partially shielded from the depositing tin oxide by one or more other layers closer to the external substrate surface, do not get uniformly coated, if at all, in a "line-of-sight" process. A particular problem with "line-of-sight" processes is the need to maintain a fixed distance between the tin source and the substrate. Otherwise, tin dioxide can be deposited or formed off the substrate and lost, with a corresponding loss in process and reagent efficiency.

One of the preferred substrates for use with batteries, such as lead-acid batteries, are glass fibers, in particular a porous mat of glass fibers. Although the CVD process is useful for coating a single flat surface, for the reasons noted above this process tends to produce non-uniform and/or discontinuous coatings on woven glass fiber mats. Such non uniformities and/or discontinuities are detrimental to the electrical and chemical properties of the coated substrate. A new process, e.g., a "non-line-of-sight" or "three dimensional" process, useful for coating such substrates would be advantageous. As used herein, a "non-line-of-sight" or "three dimensional" process is a process which coats surfaces of a substrate with tin oxide which surfaces would not be directly exposed to vaporous tin oxide-forming compounds being deposited on the external surface of the substrate during the first contacting step. In other words, a "three dimensional" process coats coatable substrate surfaces which are at least partially shielded by other portions of the substrate which are closer to the external surface of the substrate, e.g., the surfaces of the internal fibers of a porous mat of glass fibers.

In "Preparation of Thick Crystalline Films of Tin Oxide and Porous Glass Partially Filled with Tin Oxide", by R. G. Bartholomew et al, J. Electrochem, Soc. Vol 116, No. 9, p 1205(1969), a method is described for producing films of $SnO_2$ on a 96% silica glass substrate by oxidation of stannous chloride. The plates of glass are pretreated to remove moisture, and the entire coating process appears to have been done under anhydrous conditions. Specific electrical resistivity values for $SnO_2$-porous glass were surprisingly high. In addition, doping with $SbCl_3$ was attempted, but substantially no improvement, i.e., reduction, in electrical resistivity was observed. Apparently, no effective amount of antimony was incorporated. No other dopant materials were disclosed.

In "Physical Properties of Tin Oxide Films Deposited by Oxidation of $SnCl_2$", by N. Srinivasa Murty et al, Thin Solid Films, 92(1982) 347–354, a method for depositing $SnO_2$ films was disclosed which involved contacting a substrate with a combined vapor of $SnCl_2$ and oxygen. Although no dopants were used, dopant elements such as antimony and fluorine were postulated as being useful to reduce the electrical resistivity of the $SnO_2$ films.

This last described method is somewhat similar to the conventional spray pyrolysis technique for coating substrates. In the spray pyrolysis approach, tin chloride dissolved in water at low pH is sprayed onto a hot, i.e., on the order of about 600° C., surface in the presence of an oxidizing vapor, e.g., air. The tin chloride is immediately converted, e.g., by hydrolysis and/or oxidation, to $SnO_2$, which forms a film on the surface. In order to get a sufficient $SnO_2$ coating on a glass fiber substrate to allow the coated substrate to be useful as a component of a lead-acid battery, on the order of about 20 spraying passes on each side have been required. In other words, it is frequently difficult, if not impossible, with spray pyrolysis to achieve the requisite thickness and uniformity of the tin oxide coating on substrates, in particular three dimensional substrates.

Dislich, et al U.S. Pat. No. 4,229,491 discloses a process for producing cadmium stannate layers on a glass substrate. The process involves dipping the substrate into an alcoholic solution of a reaction product containing cadmium and tin; withdrawing the substrate from the solution in a humid atmosphere; and gradually heating the coated substrate to 650° C. whereby hydrolysis and pyrolysis remove residues from the coated substrate. Dislich, et al is not concerned with coating substrates for lead-acid batteries, let alone the stability required, and is not concerned with maintaining a suitable concentration of a volatile dopant, such as fluoride, in the coating composition during production of the coated substrate.

Pytlewski U.S. Pat. No. 4,229,491 discloses changing the surface characteristics of a substrate surface, e.g., glass pane, by coating the surface with a tin-containing polymer. These polymers, which may contain a second metal such as iron, cobalt, nickel, bismuth, lead, titanium, vanadium, chromium, copper, molybdenum, antimony and tungsten, are prepared in the form of a colloidal dispersion of the polymer in water. Pytlewski discloses that such polymers, when coated on glass surfaces, retard soiling. Pytlewski is not concerned with the electrical properties of the polymers or of the coated substrate surfaces.

Gonzalez-Oliver, C. J. R. and Kato, I. in "Sn (Sb)-Oxide Sol-Gel Coatings of Glass", Journal of Non-Crystalline Solids 82(1986) 400–410 North-Holland, Amsterdam, describe a process for applying an electrically conductive coating to glass substrates with solutions containing tin and antimony. This coating is applied by repeatedly dipping the substrate into the solution or repeatedly spraying the solution onto the substrate. After each dipping or spraying, the coated substrate is subjected to elevated temperatures on the order of 550° C.–600° C. to fully condense the most recently applied layer. Other workers, e.g., R. Pryane and I. Kato, have disclosed coating glass substrates, such as electrodes, with doped tin oxide materials. The glass substrate is dipped into solution containing organo-metallic compounds of tin and antimony. Although multiple dippings are disclosed, after each dipping the coated substrate is treated at temperatures between 500° C. and 630° C. to finish off the polycondensation reactions, particularly to remove deleterious carbon, as well as to increase the hardness and density of the coating.

Although a substantial amount of work has been done, there continues to be a need for a new method for coating substrates with doped tin oxide.

SUMMARY OF THE INVENTION

A new process for at least partially coating a substrate with a doped tin oxide-forming material has been discovered. In brief, the process comprises contacting the substrate with stannous chloride, in a vaporous form and/or in a liquid form, to form a stannous chloride-containing coating on the substrate; contacting the substrate with a fluorine component, i.e., a component containing free fluorine and/or combined fluorine (as in a compound), to form a fluorine component-containing coating on the substrate; and contacting the thus coated substrate with an oxidizing agent to form a fluorine doped tin oxide, preferably tin dioxide, coating on the substrate. The contacting of the substrate with the stannous chloride and with the fluorine component can occur together, i.e., simultaneously, and/or in separate steps.

This process can provide coated substrates which have substantial electronic conductivity so as to be suitable for use as components in batteries, such as lead-acid storage batteries. Substantial coating uniformity, e.g., in the thickness of the tin oxide-containing coating and in the distribution of dopant component in the coating, is obtained. Further, the present fluorine doped tin oxide coated substrates have outstanding stability, e.g., in terms of electrical properties and morphology, and are thus useful in various applications. In addition, the process is efficient in utilizing the materials which are employed to form the coated substrate.

DETAILED DESCRIPTION OF THE INVENTION

In one broad aspect, the present coating process comprises contacting a substrate with a composition comprising tin chloride forming components, including stannic chloride, stannous chloride and mixtures thereof, preferably stannous chloride, at conditions, preferably substantially non-deleterious oxidizing conditions, more preferably in a substantially inert environment or atmosphere, effective to form a stannous chloride-containing coating on at least a portion of the substrate. The substrate is also contacted with at least one fluorine component at conditions, preferably substantially non-deleterious oxidizing conditions, more preferably in a substantially inert atmosphere, effective to form a fluorine component-containing coating on at least a portion of the substrate. This substrate, including one or more coatings containing tin chloride, preferably stannous chloride, and fluorine component, is contacted with at least one oxidizing agent at conditions effective to convert tin chloride to tin oxide and form a fluorine doped tin oxide, preferably tin dioxide, coating on at least a portion of the substrate. By "non-deleterious oxidation" is meant that the majority of the oxidation of stannous chloride coated onto the substrate takes place in the oxidizing agent contacting step of the process, rather than in process step or steps conducted at non-deleterious oxidizing conditions. The process as set forth below will be described with reference to stannous chloride, which has been found to provide particularly outstanding process and product properties.

The fluorine component-containing coating may be applied to the substrate before and/or after and/or during the time the substrate is coated with stannous chloride. In a particularly useful embodiment, the stannous chloride and the fluorine component are both present in the same composition used to contact the substrate so that the stannous chloride-containing coating further contains the fluorine component. This embodiment provides processing efficiencies since the number of process steps is reduced (relative to separately coating the substrate with stannous chloride and fluorine component). In addition, the relative amount of stannous chloride and fluorine component used to coat the substrate can be effectively controlled in this "single coating composition" embodiment of the present invention.

In another useful embodiment, the substrate with the stannous chloride-containing coating and the dopant component-containing coating is maintained at conditions, preferably at substantially non-deleterious oxidizing conditions, for a period of time effective to do at least one of the following: (1) coat a larger portion of the substrate with stannous chloride-containing coating; (2) distribute the stannous chloride coating over the substrate; (3) make the stannous chloride-containing coating more uniform in thickness; and (4) distribute the dopant component more uniformly in the stannous chloride-containing coating. Such maintaining preferably occurs for a period of time in the range of about 1 minute to about 20 minutes. Such maintaining is preferably conducted at the same or a higher temperature relative to the temperature at which the substrate/stannous chloride-containing composition contacting occurs. Such maintaining, in general, acts to make the coating more uniform and, thereby provides for beneficial electrical conductivity properties. The thickness of the tin oxide-containing coating is preferably in the range of about 0.1 micron to about 10 microns, more preferably about 0.25 micron to about 1.25 microns.

The stannous chloride which is contacted with the substrate is in a vaporous phase or state, or in a liquid phase or state at the time of the contacting. The composition which includes the stannous chloride preferably also includes the fluorine component or components. This composition may also include one or more other materials, e.g., dopants, catalysts, grain growth inhibitors, solvents, etc., which do not substantially adversely promote the premature hydrolysis of the stannous chloride and/or the fluorine component, and do not substantially adversely affect the properties of the final product, such as by leaving a detrimental residue in the final product prior to the formation of the tin oxide-containing coating. Thus, it has been found to be important, e.g., to obtaining a tin oxide coating with good structural and/or electronic properties, that undue hydrolysis of the stannous chloride and fluorine component be avoided. This is contrary to certain of the prior art which actively utilized the simultaneous hydrolysis reaction as an approach to form the final coating. Examples of useful other materials include organic components such as acetonitrile, ethyl acetate, dimethyl sulfoxide, propylene carbonate and mixtures thereof; certain inorganic salts and mixtures thereof. These other materials, which are preferably substantially anhydrous, may often be considered as a carrier, e.g., solvent, for the stannous chloride and/or fluorine component to be contacted with the substrate. It has also been found that the substrate can first be contacted with a stannous chloride powder, preferably with a film forming amount of stannous chloride powder, followed by increasing the temperature to the liquidus point of the stannous chloride powder on the substrate to allow coating of, and preferably equilibration on, the substrate. The size distribution of the stannous chloride powder and the amount of such powder applied to the substrate are preferably chosen so as to distribute the coating over substantially the entire substrate.

The stannous chloride and/or fluorine component to be contacted with the substrate may be present in a molten state. For example, a melt containing molten stannous chloride and/or stannous fluoride may be used. The molten composition may include one or more other materials, having properties as noted above, to produce a mixture, e.g., a eutectic mixture, having a reduced melting point and/or boiling point. The use of molten stannous chloride and/or fluorine component provides advantageous substrate coating while reducing the handling and disposal problems caused by a solvent. In addition, the substrate is very effectively and efficiently coated so that coating material losses are reduced.

The stannous chloride and/or fluorine component to be contacted with the substrate may be present in a vaporous state. As used in this context, the term "vaporous state" refers to both a substantially gaseous state and a state in which the stannous chloride and/or fluorine component are present as drops or droplets in a carrier gas, i.e., an atomized state. Liquid state stannous chloride and/or fluorine component may be utilized to generate such vaporous state compositions.

In addition to the other materials, as noted above, the composition containing stannous chloride and/or the fluorine component may also include one or more grain growth inhibitor components. Such inhibitor component or components are present in an amount effective to inhibit grain growth in the tin oxide-containing coating. Reducing grain growth leads to beneficial coating properties, e.g., higher electrical conductivity, more uniform morphology, and/or greater overall stability. Among useful grain growth inhibitor components are components which include at least one metal, in particular potassium, calcium, magnesium, silicon and mixtures thereof. Of course, such grain growth inhibitor components should have no substantial detrimental effect on the final product.

The fluorine component may be deposited on the substrate separately from the stannous chloride, e.g., before and/or during and/or after the stannous chloride/substrate contacting. If the fluorine component is deposited on the substrate separately from the stannous chloride, it is preferred that the fluorine component be deposited after the stannous chloride.

Any suitable fluorine component may be employed in the present process. Such fluorine component should provide sufficient fluorine, e.g., fluoride, dopant so that the final fluorine doped tin oxide coating has the desired properties, e.g., electronic conductivity, stability, etc. Care should be exercised in choosing the fluorine component or components for use. For example, the fluorine component should be sufficiently compatible with the stannous chloride so that the desired fluorine doped tin oxide coating can be formed. Fluorine components which have excessively high boiling points and/or are excessively volatile (relative to stannous chloride), at the conditions employed in the present process, are to be avoided since, for example, the final coating may not be sufficiently doped and/or a relatively large amount of the fluorine component or components may be lost during processing. It may be useful to include one or more property altering components, e.g., boiling point depressants, in the composition containing the fluorine component to be contacted with the substrate. Such property altering component or components are included in an amount effective to alter one or more properties, e.g., boiling point, of the fluorine component, e.g., to improve the compatibility or reduce the incompatibility between the fluorine component and stannous chloride.

Particularly useful fluorine components for use in the present invention are selected from stannous fluoride, stannic fluoride, hydrogen fluoride and mixtures thereof. When hydrogen fluoride is used in the present invention, it has been found that excellent dopant incorporation is achieved. It is believed that the hydrogen fluoride is able to react with the tin chloride compound, for example, stannous chloride, to form tin fluoride, for example, stannous fluoride, which provides for substantial dopant incorporation. When stannous fluoride is used as a fluorine component, it is preferred to use one or more boiling point depressants to reduce the apparent boiling point of the stannous fluoride, in particular to at least about 850° C. or less.

The use of a fluorine dopant is an important feature of certain aspects of the present invention. First, it has been found that fluorine dopants can be effectively and efficiently incorporated into the tin oxide-containing coating. In addition, such fluorine dopants act to provide tin oxide-containing coatings with good electronic properties referred to above, morphology and stability. This is in contrast to certain of the prior art which found antimony dopants to be ineffective to improve the electronic properties of tin oxide coatings.

The liquid, e.g., molten, composition which includes stannous chloride may, and preferably does, also include the fluorine component. In this embodiment, the fluorine component or components are preferably soluble in the composition. Vaporous mixtures of stannous chloride and fluorine components may also be used. Such compositions are particularly effective since the amount of dopant in the final doped tin oxide coating can be controlled by controlling the make-up of the composition. In addition, both the stannous chloride and fluorine component are deposited on the substrate in one step. Moreover, if stannous fluoride and/or stannic fluoride are used, such fluorine components provide the dopant and are converted to tin oxide during the oxidizing agent/substrate contacting step. This enhances the overall utilization of the coating components in the present process. Particularly useful compositions comprise about 50% to about 98%, more preferably about 70% to about 95%, by weight of stannous chloride and about 2% to about 50%, more preferably about 5% to about 30%, by weight of fluorine component, in particular stannous fluoride.

In one embodiment, a vaporous stannous chloride composition is utilized to contact the substrate, and the composition is at a higher temperature than is the substrate. The make-up of the vaporous stannous chloride-containing composition is such that stannous chloride condensation occurs on the cooler substrate. If the fluorine component is present in the composition, it is preferred that such fluorine component also condense on the substrate. The amount of condensation can be controlled by controlling the chemical make-up of the vaporous composition and the temperature differential between the composition and the substrate. This "condensation" approach very effectively coats the substrate to the desired coating thickness without requiring that the substrate be subjected to numerous individual or separate contactings with the vaporous stannous chloride-containing composition. As noted above, previous vapor phase coating methods have often been handicapped in requiring that the substrate be repeatedly recontacted in order to get the desired coating thickness. The present "condensation" embodiment reduces or eliminates this problem.

The substrate including the stannous chloride-containing coating and the fluorine component-containing coating is contacted with an oxidizing agent at conditions effective to convert stannous chloride to tin oxide, preferably substantially tin dioxide, and form a fluorine doped tin oxide coating on at least a portion of the substrate. Water, e.g., in the form of a controlled amount of humidity, is preferably present during the coated substrate/oxidizing agent contacting. The vapor can be added at elevated temperatures as saturated or super saturated steam in order to enhance overall conversion to tin oxide at reduced contacting times. This is in contrast with certain prior tin oxide coating methods which are conducted under anhydrous conditions. The presence of water during this contacting has been found to provide a doped tin oxide coating having excellent electrical conductivity properties.

Any suitable oxidizing agent may be employed, provided that such agent functions as described herein. Preferably, the oxidizing agent (or mixtures of such agents) is substantially gaseous at the coated substrate/oxidizing agent contacting conditions. The oxidizing agent preferably includes reducible oxygen, i.e., oxygen which is reduced in oxidation state as a result of the coated substrate/oxidizing agent contacting. More preferably, the oxidizing agent comprises molecular oxygen, either alone or as a component of a gaseous mixture, e.g., air.

The substrate may be composed of any suitable material and may be in any suitable form. Preferably, the substrate is such so as to minimize or substantially eliminate the migration of ions and other species, if any, from the substrate to the tin oxide-containing coating which are deleterious to the functioning or performance of the coated substrate in a particular application. In addition, it can be precoated to minimize migration, for example a silica precoat and/or to improve wetability and uniform distribution of the coating materials on the substrate. In order to provide for controlled electronic conductivity in the fluorine doped tin oxide coating, it is preferred that the substrate be substantially non-electronically conductive when the coated substrate is to be used as a component of an electric energy storage battery. In one embodiment, the substrate is inorganic, for example glass and/or ceramic. Although the present process may be employed to coat two dimensional substrates, such as substantially flat surfaces, it has particular applicability in coating three dimensional substrates. Thus, the present process is a three dimensional process. Examples of three dimensional substrates which can be coated using the present process include spheres, extrudates, flakes, single fibers, fiber rovings, chopped fibers, fiber mats, porous substrates, irregularly shaped particles, e.g., catalyst supports, multi-channel monoliths and the like. Acid resistant glass fibers, especially woven and non-woven mats of acid resistant glass fibers, are particularly useful substrates when the fluorine doped tin oxide coated substrate is to be used as a component of a battery, such as a lead-acid electrical energy storage battery. More particularly, the substrate for use in a battery is in the form of a body of woven or non-woven fibers, still more particularly, a body of fibers having a porosity in the range of about 60% to about 95%. Porosity is defined as the percent or fraction of void space within a body of fibers. The above-noted porosities are calculated based on the fibers including the desired fluorine doped tin oxide coating.

The substrate for use in lead-acid batteries, because of availability, cost and performance considerations, preferably comprises acid resistant glass, more preferably in the form of fibers, as noted above.

The substrate for use in lead-acid batteries is acid resistant. That is, the substrate exhibits some resistance to corrosion, erosion and/or other forms of deterioration at the conditions present, e.g., at or near the positive plate, or positive side of the bipolar plates, in a lead-acid battery. Although the fluorine doped tin oxide coating does provide a degree of protection for the substrate against these conditions, the substrate should itself have an inherent degree of acid resistance. If the substrate is acid resistant, the physical integrity and electrical effectiveness of the doped tin oxide coating and of the whole present battery element, is better maintained with time relative to a substrate having reduced acid resistance. If glass is used as the substrate, it is preferred that the glass have an increased acid resistance relative to E-glass. Preferably, the acid resistant glass substrate is at least as resistant as is C-or T- glass to the conditions present in a lead-acid battery.

Typical compositions of E-glass and C-glass are as follows:

| | Weight Percent | | |
|---|---|---|---|
| | E-glass | C-glass | T-glass |
| Silica | 54 | 65 | |
| Alumina | 14 | 4 | 6 |
| Calcia | 18 | 14 | 10* |
| Magnesia | 5 | 3 | — |
| Soda + Potassium Oxide | 0.5 | 9 | 13 |
| Boria | 8 | 5 | 6 |
| Titania + Iron Oxide | 0.5 | — | — |

*including MgO

Preferably the glass contains more than about 60% by weight of silica and less than about 35% by weight of alumina, and alkali and alkaline earth metal oxides.

The conditions at which each of the steps of the present process occur are effective to obtain the desired result from each such step and to provide a fluorine doped tin oxide coated substrate. The substrate/stannous chloride contacting and the substrate/fluorine component contacting preferably occur at a temperature in the range of about 250° C. to about 375° C., more preferably about 275° C. to about 350° C. The amount of time during which stannous chloride and/or fluorine component is being deposited on the substrate depends on a number of factors, for example, the desired thickness of the doped tin oxide coating, the amounts of stannous chloride and fluorine component available for substrate contacting, the method by which the stannous chloride and fluorine component are contacted with the substrate and the like. Such amount of time is preferably in the range of about 0.5 minutes to about 20 minutes, more preferably about 1 minute to about 10 minutes.

If the coated substrate is maintained in a substantially non-deleterious oxidizing environment, it is preferred that such maintaining occur at a temperature in the range of about 275° C. to about 375° C., more preferably about 300° C. to about 350° C. for a period of time in the range of about 0.1 minutes to about 20 minutes, more preferably about 1. minute to about 10 minutes. The coated substrate/oxidizing agent contacting preferably occurs at a temperature in the range of about 350° C. to about 600° C., more preferably about 400° C. to about 550° C., for a period of time in the range of about 0.1 minutes to about 10 minutes. A particular advantage of the process of this invention is the temperatures used for oxidation have been found to be lower, in certain cases, significantly lower, i.e., 50° to 100° C. than the temperatures required for spray hydrolysis. This is very significant and unexpected, provides for process efficiencies and reduces, and in some cases substantially eliminates, migration of deleterious elements from the substrate to the tin oxide layer. Excessive sodium migration, e.g., from the substrate, can reduce electronic conductivity.

The pressure existing or maintained during each of these steps may be independently selected from elevated pressures (relative to atmospheric pressure), atmospheric pressure, and reduced pressures (relative to atmospheric pressure). Slightly reduced pressures, e.g., less than atmospheric pressure and greater than about 8 psia and especially greater than about 11 psia, are preferred.

The fluorine doped tin oxide coated substrate of the present invention may be, for example, a catalyst itself or a component of a composite together with one or more matrix materials. The composites may be such that the matrix material or materials substantially totally encapsulate or surround the coated substrate, or a portion of the coated substrate may extend away from the matrix material or materials.

Any suitable matrix material or materials may be used in a composite with the fluorine doped tin oxide coated substrate. Preferably, the matrix material comprises a polymeric material, e.g., one or more synthetic polymers, more preferably an organic polymeric material. The polymeric material may be either a thermoplastic material or a thermoset material. Among the thermoplastics useful in the present invention are the polyolefins, such as polyethylene, polypropylene, polymethylpentene and mixtures thereof; and poly vinyl polymers, such as polystyrene, polyvinylidene difluoride, combinations of polyphenylene oxide and polystyrene, and mixtures thereof. Among the thermoset polymers useful in the present invention are epoxies, phenol-formaldehyde polymers, polyesters, polyvinyl esters, polyurethanes, melamineformaldehyde polymers, and urea-formaldehyde polymers. Also included among the useful polymeric materials are natural and synthetic rubber materials, such as styrene butadiene rubbers; acrylonitrile rubbers, such as acrylonitrile butadiene styrene rubbers; ethylene propylene rubbers; chlorinated derivatives thereof; and mixtures thereof.

When used in battery applications, the present doped tin oxide coated substrate is preferably at least partially embedded in a matrix material. The matrix material should be at least initially fluid impervious to be useful in batteries. If the fluorine doped tin oxide coated substrate is to be used as a component in a battery, e.g., a lead-acid electrical energy storage battery, it is situated so that at least a portion of it contacts the positive active electrode material. Any suitable positive active electrode material or combination of materials useful in lead-acid batteries may be employed in the present invention. One particularly useful positive active electrode material comprises electrochemically active lead oxide, e.g., lead dioxide, material. A paste of this material is often used. If a paste is used in the present invention, it is applied so that there is appropriate contacting between the fluorine doped tin oxide coated substrate and the paste.

In order to provide enhanced bonding between the fluorine doped tin oxide coated substrate and the matrix material, it has been found that the preferred matrix materials have an increased polarity, as indicated by an increased dipole moment, relative to the polarity of polypropylene. Because of weight and strength considerations, if the matrix material is to be a thermoplastic polymer, it is preferred that the matrix be a polypropylene-based polymer which includes one or more groups effective to increase the polarity of the polymer relative to polypropylene. Additive or additional monomers, such as maleic anhydride, vinyl acetate, acrylic acid, and the like and mixtures thereof, may be included prior to propylene polymerization to give the product propylene-based polymer increased polarity. Hydroxyl groups may also be included in a limited amount, using conventional techniques, to increase the polarity of the final propylene-based polymer.

Thermoset polymers which have increased polarity relative to polypropylene are more preferred for use as the present matrix material. Particularly preferred thermoset polymers include epoxies, phenol-formaldehyde polymers, polyesters, and polyvinyl esters.

A more complete discussion of the presently useful matrix materials is presented in Fitzgerald, et al U.S. Pat. No. 4,708,918, the entire disclosure of which is hereby incorporated by reference herein.

Various techniques, such as casting, molding and the like, may be used to at least partially encapsulate or embed the fluorine doped tin oxide coated substrate into the matrix material or materials and form composites. The choice of technique may depend, for example, on the type of matrix material used, the type and form of the substrate used and the specific application involved. Certain of these techniques are presented in U.S. Pat. No. 4,547,443, the entire disclosure of which is hereby incorporated by reference herein. One particular embodiment involves pre-impregnating (or combining) that portion of the doped tin oxide coated substrate to be embedded in the matrix material with a relatively polar (increased polarity relative to polypropylene) thermoplastic polymer, such as polyvinylidene difluoride, prior to the coated substrate being embedded in the matrix material. This embodiment is particularly useful when the matrix material is itself a thermoplastic polymer, such as modified polypropylene, and has been found to provide improved bonding between the fluorine doped tin oxide coated substrate and the matrix material.

The bonding between the matrix material and the fluorine doped tin oxide coated, acid-resistant substrate is important to provide effective battery operation. In order to provide for improved bonding of the fluorine doped tin oxide coating (on the substrate) with the matrix material, it is preferred to at least partially, more preferably substantially totally, coat the fluorine doped tin oxide coated substrate with a coupling agent which acts to improve the bonding of the fluorine doped tin oxide coating with the matrix. This is particularly useful when the substrate comprises acid resistant glass fibers. Any suitable coupling agent may be employed. Such agents preferably comprise molecules which have both a polar portion and a non-polar portion. Certain materials generally in use as sizing for glass fibers may be used here as a "size" for the doped tin oxide coated glass fibers. The amount of coupling agent used to coat the fluorine doped tin oxide coated glass fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. U.S. Pat. No. 4,154,638 discloses one silane-based coupling agent adapted for use with tin oxide surfaces. The entire disclosure of this patent is hereby expressly incorporated by reference herein.

In the embodiment in which the fluorine doped tin oxide coated substrate is used as a component of a bipolar plate in a lead-acid battery, it is preferred to include a fluid-impervious conductive layer that is resistant to reduction adjacent to, and preferably in electrical communication with, the second surface of the matrix material. The conductive layer is preferably selected from metal, more preferably lead, and substantially non-conductive polymers, more preferably synthetic polymers, containing conductive material. The non-conductive polymers may be chosen from the polymers discussed previously as matrix materials. One particular embodiment involves using the same polymer in the matrix material and in the conductive layer. The electrically conductive material contained in the non-conductive layer preferably is selected from the group consisting of graphite, lead and mixtures thereof.

In the bipolar plate configuration, a negative active electrode layer located adjacent, and preferably in electric communication with, the fluid impervious conductive layer is included. Any suitable negative active electrode material useful in lead-acid batteries may be employed. One particularly useful negative active electrode material comprises lead, e.g., sponge lead. Lead paste is often used.

In yet another embodiment, a coated substrate including tin oxide, preferably electronically conductive tin oxide, and at least one additional catalyst component in an amount effective to promote a chemical reaction is formed. Preferably, the additional catalyst component is a metal and/or a component of a metal effective to promote the chemical reaction. The promoting effect of the catalyst component may be enhanced by the presence of an electrical field or electrical current in proximity to the component. Thus, the tin oxide, preferably on a substantially nonelectronically conductive substrate, e.g., a catalyst support, can provide an effective and efficient catalyst for chemical reactions, including those which occur or are enhanced when an electric field or current is applied in proximity to the catalyst component. Thus, it has been found that the present coated substrates are useful as active catalysts and supports for additional catalytic components. Without wishing to limit the invention to any particular theory of operation, it is believed that the outstanding stability, e.g., with respect to electronic properties and/or morphology and/or stability, of the present tin oxides plays an important role in making useful and effective catalyst materials. Any chemical reaction, including a chemical reaction the rate of which is enhanced by the presence of an electrical field or electrical current as described herein, may be promoted using the present catalyst component tin oxide-containing coated substrates. A particularly useful class of chemical reactions are those involving chemical oxidation or reduction. For example, an especially useful and novel chemical reduction includes the chemical reduction of nitrogen oxides, to minimize air pollution, with a reducing gas such as carbon monoxide, hydrogen and mixtures thereof and/or an electron transferring electrical field. Of course, other chemical reactions, e.g., hydrocarbon reforming, dehydrogenation, such as alkylaromatics to olefins and olefins to dienes, hydrodecyclization, isomerization, ammoxidation, such as with olefins, aldol condensations using aldehydes and carboxylic acids and the like, may be promoted using the present catalyst component, tin oxide-containing coated substrates. As noted above, it is preferred that the tin oxide in the catalyst component, tin oxide-containing substrates be electronically conductive. Although fluorine doped tin oxide is particularly useful, other dopants may be incorporated in the present catalyst materials to provide the tin oxide with the desired electronic properties. For example, antimony may be employed as a tin oxide dopant. Such other dopants may be incorporated into the final catalyst component, tin oxide-containing coated substrates using one or more processing techniques substantially analogous to procedures useful to incorporate fluorine dopant, e.g., as described herein.

Particularly useful chemical reactions as set forth above include the oxidative dehydrogenation of ethylbenzene to styrene and 1-butene to 1,3-butadiene; the ammoxidation of propylene to acrylonitrile; aldol condensation reactions for the production of unsaturated acids, i.e., formaldehyde and propionic acid to form methacrylic acid and formaldehyde and acetic acid to form acrylic acid; the isomerization of butenes; and the oxidation of methane to methanol. It is believed, without limiting the invention to any specific theory of operation, that the stability of the catalysts, the redox activity of the tin oxide, i.e., stannous, stannic, mixed tin oxide redox couple, morphology and the tin oxide catalytic and/or support interaction with other catalytic species provides for the making of useful and effective catalyst materials. In certain catalytic reactions, such as $NO_x$ reduction and oxidative dehydrogenation, it is believed that lattice oxygen from the regenerable tin oxide redox couple participates in the reactions.

The tin oxide-containing coated substrates of the present invention may be employed alone or as a catalyst and/or support in a sensor, in particular gas sensors. Preferably, the coated substrates includes a sensing component similar to the catalyst component, as described herein. The present sensors are useful to sense the presence or concentration of a component, e.g., a gaseous component, of interest in a medium, for example, hydrogen, carbon monoxide, methane and other alkanes, alcohols, aromatics, e.g., benzene, water, etc., e.g., by providing a signal in response to the presence or concentration of a component of interest, e.g., a gas of interest, in a medium. Such sensors are also useful where the signal provided is enhanced by the presence of an electrical field or current in proximity to the sensing component. The sensing component is preferably one or more metals or metallic containing sensing components, for example, platinum, palladium, silver and zinc. The signal provided may be the result of the component of interest itself impacting the sensing component and/or it may be the result of the component of interest being chemically reacted, e.g., oxidized or reduced, in the presence of the sensing component.

The stability and durability for the present tin oxide materials are believed to make them very useful as catalysts, sensors, and supports for additional catalysts and sensors in aggressive and/or harsh environments, particularly acid, i.e., sulfur and nitrogen acid environments.

Any suitable catalyst component (or sensing component) may be employed, provided that it functions as described herein. Among the useful metal catalytic components and metal sensing components are those selected from components of the transition metals, the rare earth metals, certain other catalytic components and mixtures thereof, in particular catalysts containing gold, silver, copper, vanadium, chromium, tungsten, zinc, indium, antimony, the platinum group metals, i.e., platinum, palladium, iron, nickel, manganese, cesium, titanium, etc. Although metal containing compounds may be employed, it is preferred that the metal catalyst component (and/or metal sensing component) included with the coated substrate comprise elemental metal and/or metal in one or more active oxidized forms, for example, $Cr_2O_3$, $Ag_2O$, $Sb_2O_4$, etc.

The preferred support materials include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces, i.e., non line-of-site materials. A particularly useful catalyst support is a multi channel monolith made from corderite which has been coated with alumina. The catalyst materials can be used as is or further processed such as by sintering of powered catalyst materials into larger aggregates. The aggregates can incorporate other powders, for example, other oxides, to form the aggregates.

The catalyst components (or sensing components) may be included with the coated substrate using any one or more of various techniques, e.g., conventional and well known techniques. For example, metal catalyst components (metal sensing components) can be included with the coated substrate by impregnation; electrochemical deposition; spray hydrolysis; deposition from a molten salt mixture; thermal decomposition of a metal compound or the like. The amount of catalyst component (or sensing component) included is sufficient to perform the desired catalytic (or sensing function), respectively, and varies from application to application. In one embodiment, the catalyst component (or sensing component) is incorporated while the tin oxide is placed on the substrate. Thus, a catalyst material, such as a salt or acid, e.g., a halide and preferably chloride, oxy chloride and cloro acids, e.g., chloro platinic acid, of the catalytic metal, is incorporated into the stannous chloride-containing coating of the substrate, prior to contact with the oxidizing agent, as described herein. This catalyst material can be combined with the stannous chloride and contacted with the substrate, or it may be contacted with the substrate separately from stannous chloride before, during and/or after the stannous chloride/substrate contacting.

The preferred approach is to incorporate catalyst-forming materials into a process step used to form a tin oxide coating. This minimizes the number of process steps but also, in certain cases, produces more effective catalysts. The choice of approach is dependent on a number of factors, including the process compatibility of tin oxide and catalyst-forming materials under given process conditions and the overall process efficiency and catalyst effectiveness.

The tin oxide/substrate combinations, e.g., the tin oxide coated substrates, of the present invention are useful in other applications as well. Among these other applications are included porous membranes, resistance heating elements, electrostatic dissipation elements, electromagnetic interference shielding elements, protective coatings and the like.

In one embodiment, a porous membrane is provided which comprises a porous substrate, preferably an inorganic substrate, and a tin oxide-containing material in contact with at least a portion of the porous substrate. In another embodiment, the porous membrane comprises a porous organic matrix material, e.g., a porous polymeric matrix material, and a tin oxide-containing material in contact with at least a portion of the porous organic matrix material. With the organic matrix material, the tin oxide-containing material may be present in the form of an inorganic substrate, porous or substantially non porous, having a tin oxide-containing coating, e.g., an electronically conductive tin oxide-containing coating, thereon.

One particularly useful feature of the present porous membranes is the ability to control the amount of tin oxide present to provide for enhanced performance in a specific application, e.g., a specific contacting process. For example, the thickness of the tin oxide-containing coating can be controlled to provide such enhanced performance. The coating process of the present invention is particularly advantageous in providing such controlled coating thickness. Also, the thickness of the tin oxide-containing coating can be varied, e.g., over different areas of the same porous membrane, such as an asymmetric porous membrane. In fact, the thickness of this coating can effect the size, e.g., diameter, of the pores. The size of the pores of the membrane or porous substrate may vary inversely with the thickness of the coating. The coating process of the present invention is particularly useful in providing this porosity control.

A resistance heating element is provided which comprises a three dimensional substrate having an electronically conductive tin oxide-containing coating on at least a portion of all three dimensions thereof. The coated substrate is adapted and structured to provide heat upon the application of an electrical potential across the coated substrate. In one embodiment, a flexible heating element is provided which comprises a flexible matrix material, e.g., an organic polymeric material in contact with a substrate having an electronically conductive tin oxide-containing coating on at least a portion thereof. The coated substrate is adapted and structured as described above.

In addition, an electrostatic dissipation/electromagnetic interference shielding element is provided which comprises a three dimensional substrate, e.g., an inorganic substrate, having an electronically conductive tin oxide-containing coating on at least a portion of all three dimensions thereof. The coated substrate is adapted and structured to provide at least one of the following: electrostatic dissipation and electromagnetic interference shielding. A flexible electrostatic dissipation/electromagnetic interference shielding element is also included in the scope of the present invention. This flexible element comprises a flexible matrix material, e.g., an organic polymeric material, in contact with a substrate having an electronically conductive tin oxide-/ containing coating on at least a portion thereof. The coated substrate of this flexible element is adapted and structured as described above.

The present coating process is particularly suitable for controlling the composition and structure of the coating on the substrate to enhance the performance of the coated substrate in a given, specific application, e.g., a specific resistance heating electrostatic dissipation or electromagnetic interference shielding application.

The present tin oxide/substrate combinations and matrix material/tin oxide/substrate combinations, which have at least some degree of porosity, hereinafter referred to as "porous contacting membranes" or "porous membranes", may be employed as active components and/or as supports for active components in systems in which the tin oxide/substrate, e.g., the tin oxide coated substrate, is contacted with one or more other components such as in, for example, separation systems, gas purification systems, filter medium systems, flocculent systems and other systems in which the stability and durability of such combinations can be advantageously utilized.

Particular applications which combine many of the outstanding properties of the products of the present invention include porous and electro membrane separations for food processing, textile/leather processing, chemical processing, bio medical processing and water treatment. For example, various types of solutions can be further concentrated, e.g., latex concentrated, proteins isolated, colloids removed, salts removed, etc. The membranes can be used in flat plate, tubular and/or spiral wound system design. In addition, the products of this invention can be used e.g., as polymeric composites, for electromagnetic and electrostatic interference shielding applications used for computers, telecommunications and electronic assemblies, as well as in low radar observable systems and static dissipation, for example, in carpeting and in lightning protection systems for aircraft.

Membranes containing voids that are large in comparison with molecular dimensions are considered porous. In these porous membranes, the pores are interconnected, and the membrane may comprise only a few percent of the total volume. Transport, whether driven by pressure, concentration, or electrical potential or field, occurs within these pores. Many of the transport characteristics of porous membranes are determined by the pore structure, with selectivity being governed primarily by the relative size of the molecules or particles involved in a particular application compared to the membrane pores. Mechanical properties and chemical resistance are greatly affected by the nature, composition and structure e.g., chemical composition and physical state, of the membrane.

Commercial micropore membranes have pore dimensions, e.g., diameters, in the range of about 0.005 micron to about 20 microns. They are made from a wide variety of materials in order to provide a range of chemical and solvent resistances. Some are fiber or fabric reinforced to obtain the required mechanical rigidity and strength. The operational characteristics of the membrane are defined sometimes in terms of the molecules or particles that will pass through the membrane pore structure.

Microporous membranes are often used as filters. Those with relatively large pores are used in separating coarse disperse, suspended substances, such as particulate contamination. Membranes with smaller pores are used for sterile filtration of gases, separation of aerosols, and sterile filtration of pharmaceutical, biological, and heat sensitive solutions. The very finest membranes may be used to separate, e.g., purify, soluble macromolecular compounds.

Porous membranes also are used in dialysis applications such a removing waste from human blood (hemodialysis), for separation of biopolymers, e.g., with molecular weights in the range of about 10,000 to about 100,000, and for the analytical measurements of polymer molecular weights. Microporous membranes also may be used as supports for very thin, dense skins or a containers for liquid membranes.

The ability of dense membranes to transport species selectively makes possible molecular separation processes such as desalination of water or gas purification, but with normal thicknesses these rates are extremely slow. In principle, the membranes could be made thin enough that the rates would be attractive, but such thin membranes would be very difficult to form and to handle, and they would have difficulty supporting the stresses imposed by the application. Conversely, microporous membranes have high transport rates but very poor selectivity for small molecules. Asymmetric membranes, for example made of the present combinations, in which a very thin, dense membrane is placed in series with a porous substructure are durable and provide high rates with high selectivity. Such asymmetric membranes and the use thereof are within the scope of the present invention.

Examples of applications for porous membranes include: separation of fungal biomass in tertiary oil recovery; concentration of magnesium hydroxide from sea water; concentration of PVC latex dispersions; separation of water/gasoline mixtures; particle removal from hot coal gasification products; desalination of sea water; enhancement of catecholamine determination; removal of colloids from high purity deionized water; treatment of wool scouring liquids; filtration of tissue homogenates; separation of antigen from antigen-antibody couple in immunoassay; purification of subcutaneous tissue liquid extracts; concentration of solubilized proteins and other cellular products; cell debris removal; concentration of microbial suspensions (microbial harvesting); enzyme recovery; hemodialysis; removal of casein, fats and lactose from whey; concentration of albumen; separation of skimmed milk; clarification of liqueur, fruit juices, sugar, and corn syrup; alcohol fermentation; sterilization of liquids, e.g., beer, wine; continuous microfiltration of vinegar; concentration and demineralization of cheese, whey, soy whey, vegetable extracts, and flavorings; sugar waste recovery; silver recovery from photorinses; dewatering of hazardous wastes; removal of suspended solids from lead-acid battery manufacture; removal of cyanides from electroplating waste waters; removal and recovery of catalyst fines; removal of radionuclides and metal hydroxide precipitates; recovery of commercial asbestos from asbestos-cement industry waste waters; re-use of waste water containing fire-fighting agent; removal of hydrocarbon oils from waste water; recovery and recycling of sewage effluent; recovery of dye stuffs from textile mill wastes; recovery of starch and proteins from factory waste, wood pulp, and paper processing; separation of water and oil emulsions; separation of carbon dioxide and methane; and catalytic chemical reactions.

As described above porous membranes can be used in a wide variety of contacting systems. In a number of applications, the porous membrane provides one or more process functions including: filtration, separation, purification, recovery of one or more components, emulsion breaking, demisting, flocculation, resistance heating and chemical reaction (catalytic or noncatalytic), e.g., pollutant destruction to a non-hazardous form. The resistance heating and chemical reaction functions (applications) set forth herein can be combined with one or more other functions set forth herein for the porous membranes as well as such other related porous membrane applications.

The porous membrane, in particular the substrate, can be predominately organic or inorganic, with an inorganic substrate being suitable for demanding process environments. The porous organic-containing membranes often include a porous organic based polymer matrix material having incorporated therein a three dimensional tin oxide-containing material, preferably including an electronically conductive tin dioxide coating, more preferably incorporating a dopant and/or a catalytic species, in an amount that provides the desired function, particularly electrical conductivity, without substantially deleteriously affecting the properties of the organic polymer matrix material. These modified polymer membranes are particularly useful in porous membrane and/or electromembrane and/or catalytic processes.

Examples of polymer materials useful in microporous membranes include cellulose esters, poly(vinyl chloride), high temperature aromatic polymers, polytetrafluoroethylene, polymers sold by E. I. DuPont Corporation under the trademark Nafion, polyethylene, polypropylene, polystyrene, polyethylene, polycarbonate, nylon, silicone rubber, and asymmetric coated polysulfone fiber.

A very convenient application for the coating process and products of this invention is the production of a controlled coating, e.g, a thin coating of tin oxide-containing material, on an inorganic substrate, particularly a porous inorganic substrate, to produce a porous membrane. The process provides a new generation of membranes: porous membranes for contacting processes, e.g., as described herein. The selectivity in filtration, particularly ultra and micro filtration, can also be enhanced by applying an electrical field and/or an electrical potential to the porous membrane. The electrical field and/or potential can be obtained using a two electrode electrical system, the membrane including a electronically conductive tin oxide-containing coating constituting one of the two electrodes (anode or cathode).

Porous multilayer asymmetric electronically conductive inorganic membranes, produced in accordance with this invention, are particularly advantageous for membrane applications. Among the advantages of such membranes are: stability at high temperature and/or at large pressure gradients, mechanical stability (reduced and even substantially no compaction of the membrane under pressure), stability against microbiological attack, chemical stability especially with organic solvents, steam sterilization at high temperatures, backflush cleaning at pressures of up to 25 atm, and stability in corrosive and oxidation environment.

A membrane can be classified as a function of the size of the particles, macromolecules and molecules separated. Micron sized porous ceramics for filtration processes can be prepared through sintering of appropriate materials as set forth herein for the manufacture of sensors. However, the preferred process for membrane-based microfiltration, ultrafiltration and reverse osmosis is to provide inorganic layers with ultrafine pores and thickness small enough to obtain high flux through the membrane, particularly membranes including tin oxide-containing coatings.

With this type of asymmetric membrane, separation processes are pressure driven. Another factor is the interaction at the membrane interface between the porous material and the material to be processed. As noted above, selectivity can be enhanced by applying an electrical field onto the surface of the membrane. The electrical field is obtained using a two electrode electrical device; the conductive membrane constituting one of the two electrodes (anode or cathode - preferably anode). Such porous membranes can be obtained with one or more electronically conductive tin oxide-containing thin layers on a porous substrate. Conductive tin oxide combined with other metal oxide mixtures also provide improved properties for porous membranes and exhibit electronic conductivity, as well as other functions, such as catalysis or resistance heating.

As set forth above, porous membranes with inorganic materials can be obtained through powder agglomeration, the pores being the intergranular spaces. Conflicting requirements such as high flow rate and mechanical stability can be achieved using an asymmetric structure. Thus, an inorganic porous membrane is obtained by superimposing a thin microporous film, which has a separative function, over a thick macroporous support. For example, conductive tin oxide coating onto the surface of filter media can be used as well as onto the surface of flat circular alumina plates. Coated alumina membranes supported on the inner part of sintered alumina tubes designed for industrial ultrafiltration processes can be used. Tube-shaped supports can be used with varying different chemical compositions, such as oxides, carbides, and clays. Coating of a homogeneous and microporous tin oxide-containing layer depends on surface homogeneity of the support and on adherence between the membrane and its support. Superior results can be obtained with particulate alumina. The inner part of the tube has a membrane comprising a layer, e.g., in the range of about 10 to about 20 microns thick, with pores, e.g., having diameters in the range of about 0.02 to about 0.2 microns sized for microfiltration purposes. The main feature of such a membrane is uniform surface homogeneity allowing for the tin oxide-containing coating to be very thin, e.g., less than about one micron in thickness.

The products of this invention, as described herein, are particularly useful for resistance heating applications. It has been found that the coated three dimensional and/or flexible substrates particularly fibers, fiber rovings, chopped fibers, and fiber mats, can be incorporated into polymeric matrix materials, particularly thermoplastic, thermoset and rubber based polymeric materials, as described herein. The tin oxide coated substrates can be, for example, E, C, S, or T glass, silica, silica alumina, silica alumina boria, silicon carbide or alumina fibers, rovings, mats, chopped mats, etc. What is unexpected is the improved mechanical properties, e.g., strength, coating adhesion and the like, of the coated substrates relative to the prior art substrates coated using spray pyrolysis techniques and the improved control over coating thickness to match conductivity requirements for a given resistance heating application. Whereas for many low to moderate temperature applications, organic polymer matrix materials are preferred, three dimensional products comprising, preferably primarily comprising flexible or rigid inorganic substrates coated with tin oxide-containing coatings have excellent high temperature performance characteristics useful, for example, in high temperature resistance heating of liquids and gases, such as air, by contact with or through (i.e., porous) such three dimensional products. Typical resistance heating applications include: heating elements or units of electric heating devices, devices for culinary purposes, warming tables, therapeutic heaters, deicing devices such as electrically heated polymer composites, low-temperature ovens such as driers, high temperature heating of gases, liquids, etc.

Another unique application of the present invention combines the stability of the tin oxide-containing coating, particularly at high temperatures and/or in demanding oxidizing environments, with the need to protect a structural element and/or to provide a fluid, i.e., gas and/or liquid, impervious material. Such structural elements are suitable for use at high temperatures, preferably greater than about 400° F., more preferably greater than about 1500° F. or even greater than about 2000° F. The present coatings preferably provide protection against oxidation. Examples of structural elements requiring such protection and/or a fluid impervious coating include three dimensional substantially carbon or inorganic materials, such as woven ceramic fibers and carbon-carbon composites, useful as turbine engine components, hot air frame components, and hypersonic vehicle structural elements or components. Due to the fact that carbon oxidizes under the demands of such environments, barrier or protective coatings are necessary. A particularly effective barrier coating is a tin oxide-containing coating formed according to the present invention because of the high temperature stability and excellent and complete coverage of such coating.

In addition, it is believed that a layer of at least one lower valence oxide of tin may form at the carbon tin oxide interface thereby giving additional barrier protection against excessive carbon oxidation to carbon oxides gases and decomposition products. The coating process of this invention, in addition, can uniformly coat three dimensional woven structures, particularly in the vaporous state, to effectively seal off diffusion of gases and/or liquids between surfaces. For example, ceramic fibers, such as those sold under the trademark Nextel by the 3M Company, can be woven into structures or structural elements, sealed off between surfaces, and used in high temperature applications. Such applications include gas and/or oil radiant and post combustion burner tubes, turbine engine components, and combustion chambers. For the latter, such structures can also contain one or more catalytically active materials that promote combustion, such as hydrocarbon combustion.

A particularly unique application that relies upon stable electronic conductivity and the physical durability of the products of this invention are dispersions of conductive material, such as powders, in fluids, e.g., water, hydrocarbons, e.g., mineral or synthetic oils, whereby an increase in viscosity, to even solidification, is obtained when an electrical field is applied to the system. These fluids are referred to as "field dependent" fluids which congeal and which can withstand forces of shear, tension and compression. These fluids revert to a liquid state when the electric field is turned off. Applications include dampening, e.g., shock absorbers, variable speed transmissions, clutch mechanisms, etc.

Certain of these and other aspects the present invention are set forth in the following description of the accompanying drawing.

BRIEF DESCRIPTION OF THE DRAWING

FIG. 1 is a block flow diagram illustrating one embodiment of the present invention.

DETAILED DESCRIPTION OF THE DRAWING

The following description specifically involves the coating of randomly oriented, woven mats of C-glass fibers. However, it should be noted that substantially the same process steps can be used to coat other substrate forms and/or materials.

A process system according to the present invention, shown generally at 10, includes a preheat section 12, a coating section 14, an equilibration section 16 and an oxidation/sintering section 18. Each of these sections is in fluid communication with the others. Preferably, each of these sections is a separate processing zone or section.

First gas curtain 20 and second gas curtain 22 provide inert gas, preferably nitrogen, at the points indicated, and, thereby effectively insure that preheat section 12, coating section 14 and equilibrium section 16 are maintained in a substantially inert environment. First exhaust 24 and second exhaust 26 are provided to allow vapors to exit or be vented from process system 10.

Randomly oriented woven mats of C-glass fibers from substrate source 28 are fed to preheat section 12 where the mats are preheated up to a maximum of 375° C. for a time of 1 to 3 minutes at atmospheric pressure to reach thermal equilibrium. These mats are composed of from 8 micron to 35 micron diameter C- or T-glass randomly oriented or woven fibers. The mats are up to 42 inches wide and between 0.058 to 0.174 mil thick. The mats are fed to process system 10 at the rate of about 1 to 5 feet per minute so that the fiber weight throughout is about 0.141 to about 2.1 pounds per minute.

The preheated mats pass to the coating section 14 where the mats are contacted with an anhydrous mixture of 70% to 95% by weight of stannous chloride and 5% to 30% by weight of stannous fluoride from raw material source 30. This contacting effects a coating of this mixture on the mats.

This contacting may occur in a number of different ways. For example, the $SnCl_2/SnF_2$ mixture can be combined with nitrogen to form a vapor which is at a temperature of from about 25° C. to about 150° C. higher than the temperature of the mats in the coating section 14. As this vapor is brought into contact with the mats, the temperature differential between the mats and the vapor and the amount of the mixture in the vapor are such as to cause controlled amounts of $SnCl_2$ and $SnF_2$ to condense on and coat the mats.

Another approach is to apply the $SnCl_2/SnF_2$ mixture in a molten form directly to the mats in an inert atmosphere. There are several alternatives for continuously applying the molten mixture to the mats. Obtaining substantially uniform distribution of the mixture on the mats is a key objective. For example, the mats can be compressed between two rollers that are continuously coated with the molten mixture. Another option is to spray the molten mixture onto the mats. The fiber mats may also be dipped directly into the melt. The dipped fiber mats may be subjected to a compression roller step, a vertical lift step and/or a vacuum filtration step to remove excess molten mixture from the fiber mats.

An additional alternative is to apply the $SnCl_2/SnFn_2$ in an organic solvent. The solvent is then evaporated, leaving a substantially uniform coating of $SnCl_2/SnF_2$ on the fiber mats. The solvent needs to be substantially non-reactive (at the conditions of the present process) and provide for substantial solubility of $SnCl_2$ and $SnF_2$. For example, the dipping solution involved should preferably be at least about 0.1 molar in $SnCl_2$. Substantially anhydrous solvents comprising acetonitrile, ethyl acetate, dimethyl sulfoxide, propylene carbonate and mixtures thereof are suitable. Stannous fluoride is often less soluble in organic solvents than is stannous chloride. One approach to overcoming this relative insolubility of $SnF_2$ is to introduce $SnF_2$ onto the fiber mats after the fiber mats are dipped into the $SnCl_2$ solution with organic solvent. Although the dopant may be introduced in the sintering section 18, it is preferred to incorporate the dopant in the coating section 14 or the equilibration section 16, more preferably the coating section 14.

Any part of process system 10 that is exposed to $SnCl_2$ and/or $SnF_2$ melt or vapor is preferably corrosion resistant, more preferably lined with inert refractory material.

In any event, the mats in the coating section 14 are at a temperature of up to about 375° C., and this section is operated at slightly less than atmospheric pressure. If the $SnCl_2/SnF_2$ coating is applied as a molten melt between compression rollers, it is preferred that such compression rollers remain in contact with the fiber mats for about 0.1 to about 2 minutes, more preferably about 1 to about 2 minutes.

After the $SnCl_2/SnF_2$ coating is applied to the fiber mats, the fiber mats are passed to the equibration section 16. Here, the coated fiber mats are maintained, preferably at a higher temperature than in coating section 14, in a substantially inert atmosphere for a period of time, preferably up to about 10 minutes, to allow the coating to more uniformly distribute over the fibers. In addition, if the fluorine component is introduced onto the fiber mats separate from the stannous chloride, the time the coated fiber mats spend in the equilibration section 16 results in the dopant component becoming more uniformly dispersed or distributed throughout the stannous chloride coating. Further, it is preferred that any vapor and/or liquid which separate from the coated fiber mats in the equilibration section 16 be transferred back and used in the coating section 14. This preferred option, illustrated schematically in FIG. 1 by lines 32 (for the vapor) and 34 (for the liquid) increases the effective overall utilization of $SnCl_2$ and $SnF_2$ in the process so that losses of these components, as well as other materials such as solvents, are reduced.

The coated fiber mats are passed from the equilibration zone 16 into the sintering zone 18 where such fiber mats are contacted with an oxidizer, such as an oxygen-containing gas, from line 36. The oxidizer preferably comprises a mixture of air and water vapor. This mixture, which preferably includes about 1% to about 50%, more preferably about 15% to about 35%, by weight of water, is contacted with the coated fiber mats at atmospheric pressure at a temperature of about 400° C. to about 550° C. for up to about 10 minutes. Such contacting results in converting the coating on the fiber mats to a fluorine doped tin dioxide coating. The fluorine doped tin oxide coated fiber mats product, which exits sintering section 18 via line 38, has useful electric conductivity properties. This product preferably has a doped tin oxide coating having a thickness in the range of about 0.5 microns to about 1 micron, and is particularly useful as a component in a lead-acid battery. Preferably, the product is substantially free of metals contamination which is detrimental to electrical conductivity.

The present process provides substantial benefits. For example, the product obtained has a fluorine doped tin oxide coating which has useful properties, e.g., outstanding electrical and/or morphological properties. This product may be employed in a lead-acid battery or in combination with a metallic catalyst to promote chemical reactions, e.g., chemical reductions, or alone or in combination with a metallic sensing component to provide sensors, e.g., gas sensors. High utilization of stannous chloride and fluorine components is achieved. In addition, high coating deposition and product throughput rates are obtained. Moreover, relatively mild conditions are employed. For example, temperatures within sintering section 18 can be significantly less than 600° C. The product obtained has excellent stability and durability.

The following non-limiting example illustrates certain aspects of the present invention.

EXAMPLE

A substrate made of C-glass was contacted with a molten mixture containing 30 mol % $SnF_2$ and 70 mol % $SnCl_2$. This contacting occurred at 350° C. in an argon atmosphere at about atmospheric pressure and resulted in a coating containing $SnCl_2$ and $SnF_2$ being placed on the substrate.

This coated substrate was then heated to 375° C. and allowed to stand in an argon atmosphere at about atmospheric pressure for about 5 minutes. The coated substrate was then fired at 500° C. for 20 minutes using flowing, i.e., at the rate of one (1) liter per minute, water saturated air at about atmospheric pressure. This resulted in a substrate having a fluorine doped tin oxide coating with excellent electronic properties. For example, the volume resistivity of this material was determined to be $7.5 \times 10^{-4}$ ohm-cm.

In the previously noted publication "Preparation of Thick Crystalline Films of Tin Oxide and Porous Glass Partially Filled with Tin Oxide and Porous Glass Partially Filled with Tin Oxide", an attempt to produce antimony doped tin oxide films on a 96% silica glass substrate involving stannous chloride oxidation at anhydrous conditions resulted in a material having a volume resistivity of $1.5 \times 10^7$ ohm-cm.

The present methods and products, illustrated above, provide outstanding advantages. For example, the fluorine doped tin oxide coated substrate prepared in accordance with the present invention has improved, i.e., reduced, electronic resistivity, relative to substrates produced by prior methods.

While this invention has been described with respect to various specific examples and embodiments, it is to be understood that the invention is not limited thereto and that it can be variously practiced within the scope of the following claims.

What is claimed is:

1. A structural element comprising a three dimensional substantially inorganic element wherein said inorganic element is selected from the group consisting of a substantially carbon composite and a ceramic and a tin oxide-containing coating thereon, said structural element being adapted for use at a temperature greater than about 400° F.

2. The structural element of claim 1 wherein said structural element is adapted for use at a temperature greater than about 1500° F. and said inorganic element is a ceramic.

3. The structural element of claim 1 wherein said structural element is adapted for use at a temperature greater than about 2000° and said inorganic element is a ceramic.

4. The structural element of claim 1 wherein the thickness of said coating is controlled to provide enhanced protection to said structural element during use thereof at a temperature greater than 400° F.

5. The structural element of claim 4 wherein said enhanced protection includes protection against oxidation.

6. The structural element of claim 1 wherein said inorganic element is a substantially thereof composite.

7. The structural element of claim 1 wherein said inorganic element is formed from ceramic fiber.

8. The structural element of claim 1 which further comprises a catalytic component in or on said structural element in an amount to promote or enhance combustion and said inorganic element is a ceramic.

9. The structural element of claim 1 produced in accordance with a process comprising:
contacting said structural element with a composition comprising a tin chloride-forming compound at conditions effective to form a tin chloride-containing coating on at least a portion of said structural element; and
contacting said structural element having said tin chloride-containing coating thereon with an oxidizing agent at conditions effective to convert tin chloride to tin oxide.

10. The structural element of claim 9 wherein said tin chloride-forming compound is stannous chloride.

11. The structural element of claim 1 wherein said coating completely covers said inorganic element.

12. The structural element of claim 1 wherein said coating is substantially fluid impervious.

13. The structural element of claim 11 wherein said coating is substantially fluid impervious.

14. A structural element comprising a three dimensional substantially carbon element and a tin oxide-containing coating thereon said structural element being adapted for use at a temperature greater than about 400° F.

15. The structural element of claim 14 wherein said substantially carbon element is a carbon-carbon composite.

16. The structural element of claim 14 produced in accordance with a process comprising:
contacting said structural element with a composition comprising a tin chloride-forming compound at conditions effective to form a tin chloride-containing coating on at least a portion of said structural element; and
contacting said structural element having said tin chloride-containing coating thereon with an oxidizing agent at conditions effective to convert tin chloride to tin oxide.

17. A burner tube structural element comprising a three dimensional element formed from a ceramic and a tin oxide-containing coating thereon, said structural element being adapted for use at a temperature greater than about 400° F.

18. The structural element of claim 17 wherein said burner tube structural element further comprises a catalytic component in or on said structural element in an amount to promote or enhance combustion.

19. The structural element of claim 17 produced in accordance with a process comprising:
contacting said structural element with a composition comprising a tin chloride-forming compound at conditions effective to form a tin chloride-containing coating on at least a portion of said structural element; and
contacting said structural element having said tin chloride-containing coating thereon with an oxidizing agent at conditions effective to convert tin chloride to tin oxide.

20. The structural element of claim 17 wherein said inorganic element is formed from ceramic fiber.

21. The structural element of claim 17 wherein said inorganic element is formed from woven ceramic fiber.

22. The structural element of claim 17 which further comprises a catalytic component in or on said structural element in an amount to promote or enhance combustion.

23. The structural element of claim 18 which further comprises a catalytic component in or on said structural element in an amount to promote or enhance combustion.

24. The structural element of claim 20 which further comprises a catalytic component in or on said structural element in an amount to promote or enhance combustion.

25. The structural element of claim 21 which further comprises a catalytic component in or on said structural element in an amount to promote or enhance combustion.

26. A structural element comprising a three dimensional substantially inorganic element said inorganic element being selected from the group consisting of a substantially carbon composite and ceramic and a tin oxide-containing coating thereon, said structural element being adapted for use in a demanding oxidizing environment.

27. The structural element of claim 26 wherein the thickness of said coating is controlled to provide enhanced protection to said inorganic element during use thereof in said demanding oxidizing environment.

28. The structural element of claim 26 wherein said inorganic element is a substantially thereof composite.

29. The structural element of claim 26 which further comprises a catalytic component in or on said structural element in an amount to promote or enhance combustion and said inorganic element is a ceramic.

30. The structural element of claim 26 wherein said inorganic element is formed from ceramic fiber.

31. The structural element of claim 26 wherein said inorganic element is formed from woven ceramic fiber.

32. A structural element comprising a three dimensional substantially inorganic element said inorganic element being selected from the group consisting of a substantially carbon composite and a ceramic and a substantially fluid impervious tin oxide-containing coating thereon, said structural element being adapted for use in a demanding oxidizing environment.

33. The structural element of claim 32 wherein the thickness of said coating is controlled to provide enhanced protection to said element during use thereof in said demanding oxidizing environment.

34. The structural element of claim 32 wherein said element is a substantially carbon composite.

35. The structural element of claim 32 which further comprises a catalytic component in or on said element in an amount to promote or enhance combustion and said inorganic element is a ceramic.

36. The structural element of claim 32 wherein said element is formed from ceramic fiber.

37. The structural element of claim 32 wherein said element is formed from woven ceramic fiber.

* * * * *